July 30, 1968
H. H. HARMS ET AL
3,394,815
TUBULAR FILTER ELEMENTS
Filed March 25, 1966
2 Sheets-Sheet 1
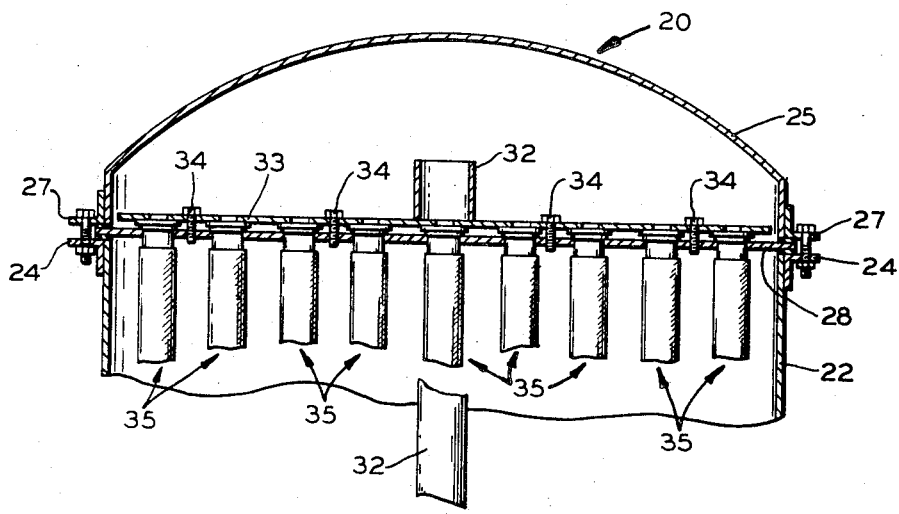
FIG. 1
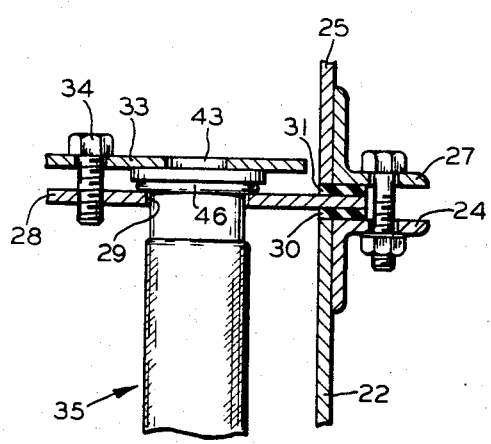
FIG. 2
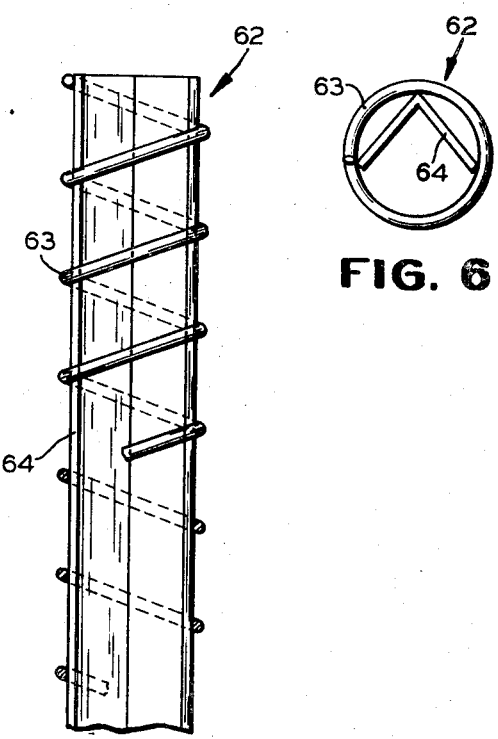
FIG. 5
FIG. 6
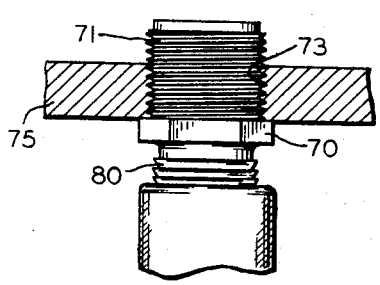
FIG. 8
INVENTORS
HAROLD H. HARMS
WILLIAM A. ACOSTA
NORMAN WILLIAMS
BY *Hugh A. Kirk*
ATTORNEY

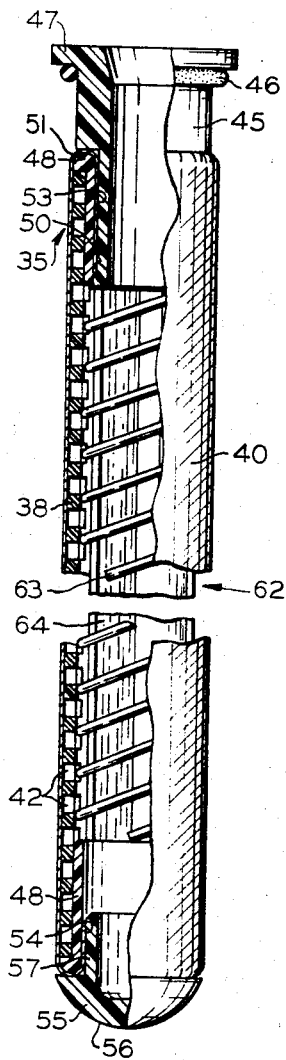
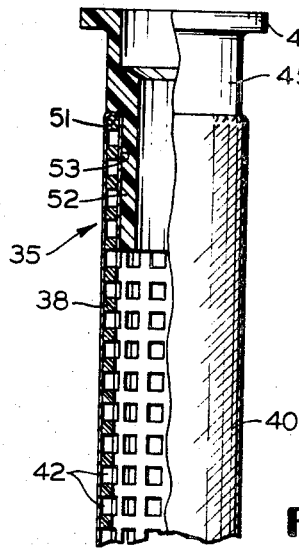
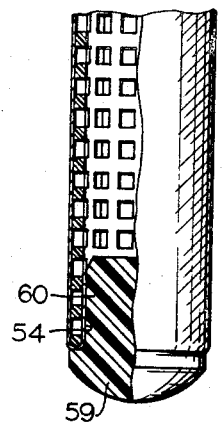
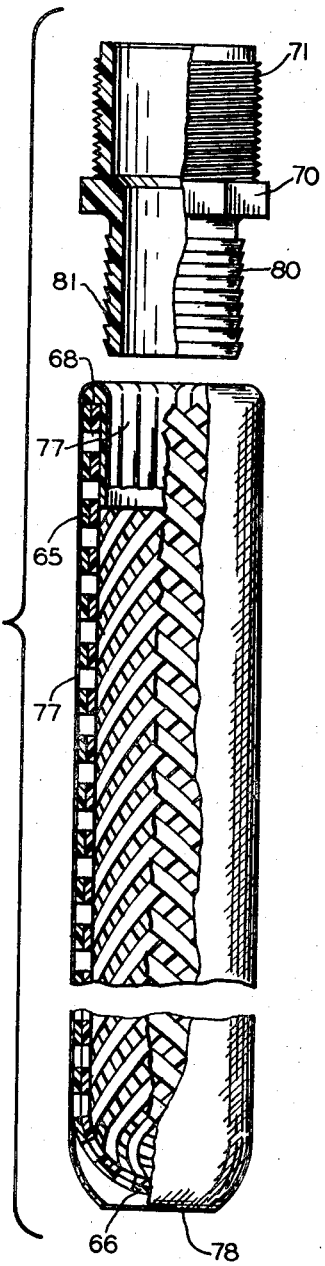
FIG. 3  FIG. 4  FIG. 7

United States Patent Office 3,394,815
Patented July 30, 1968

3,394,815
TUBULAR FILTER ELEMENTS
Harold H. Harms, Toledo, Ohio, and William A. Acosta, Plymouth Meeting, and Norman Williams, Chalfont, Pa., assignors to Henry Manufacturing Co., Inc., Bowling Green, Ohio, a corporation of Ohio
Filed Mar. 25, 1966, Ser. No. 537,552
4 Claims. (Cl. 210—323)

ABSTRACT OF THE DISCLOSURE

A tubular filter element for use in a filter pressure vessel wherein a smooth surfaced perforated plastic tube, having collars providing smooth rims at each of its ends, is surrounded by a flexible monofilament, fabric filter sleeve; the fabric sleeve having ends, longer than the plastic tube, folded over the smooth rims and into each of the ends of the tube. A plug frictionally holds one folded end of the filter sleeve inside its associated rim and a flanged apertured collar frictionally holds the other folded end of the filter sleeve inside its associated rim. A rigid means inside the tube, extending substantially its length prevents distortion, both radially and axially, of the tube.

Summary of the invention

Generally speaking, this invention is directed to elongated tubular filter elements of relatively small diameter for use in a filter pressure vessel in which a large number of the filter elements are desirable to afford a maximum filter area per unit of volume. The filter elements include a perforated tube or core which may be of extruded plastic having an irregular but smooth exterior surface and having at least one open end having a smooth rim and a flexible fabric filter sleeve thereon having its end folded over the rim and tucked into the end of the tube and retained therein by a plug, sleeve, or collar. Mounting means may include a flanged collar in an open end of the tube and a resilient sealing ring for sealing the flange against a mounting plate. Alternately, the mounting means may be in the form of a plug in the end of the tube and having a threaded end receivable in a threaded aperture in the mounting plate. Means in the form of a smooth plastic covered perforated tube, or of an elongated rigid strip or channel surrounded by a coil spring and located within and extending substantially the length of the tube serves to prevent distortion and collapse of the tube during use in a filter vessel.

An object of the invention is to provide a filter element with an elongated perforated smooth surface tubular core surrounded by a tubular sleeve or sock of a filter medium of a monofilament thread, such as nylon fabric.

Another object is to provide a flexible sleeve or sock of filter medium which may be ballooned at least slightly during backwash to facilitate the removal of any cake which may be formed thereon.

Another object is to provide a filter medium with a smooth surface and smooth apertures therein to prevent the clogging thereof with dirt particles, so that said particles can easily be removed by backwashing.

Another object is to provide a smooth outer surface, such as of plastic, for the perforated tubular core element so as to prevent wear and tear of the flexible filter medium sleeve thereon, resulting from repeated ballooning and contracting under opposite pressures during filtering and backwashing cycles.

Another object of the invention is to provide a filter tube with coupling mounting means at at least one end thereof which also serves to retain an end of the filter medium sleeve tucked into the end of the filter tube.

Another object of the invention is to provide a filter tube with a rigid interior means extending substantially the length of the tube to prevent its collapse under pressure and/or to maintain the tube substantially straight during use by preventing the tube from becoming bowed between its ends.

A further object of the invention is to provide a filter tube with collar means in the ends thereof to provide smooth or rounded edges or rims for the tube.

A still further object of the invention is to provide a rounded plug cap for an end of the tube to accommodate the closed end of a sock-type fabric filter medium.

Brief description of the drawings

The above mentioned and other features and objects of this invention and the manner of attaining them will become more apparent and the invention itself will be understood best by reference to the following description of embodiments of the invention taken in conjunction with the accompanying drawings, wherein:

FIG. 1 is a fragmentary vertical sectional view showing the upper portion of a pressure vessel filter unit incorporating the invention;

FIG. 2 is an enlarged fragmentary detail view of the right-hand portion of FIG. 1;

FIG. 3 is an enlarged vertical sectional view showing one form of filter tube assembly including the stiffener means, with parts broken away;

FIG. 4 is a view similar to FIG. 3, but showing a modified form of filter tube assembly without the stiffener means;

FIG. 5 is a fragmentary side view of the stiffener means shown in FIG. 3;

FIG. 6 is a top view of the stiffener means of FIG. 5;

FIG. 7 is a view similar to FIGS. 3 and 4 but showing a still further exploded form of filter tube assembly; and FIG. 8 is a fragmentary side view of the tube and coupling of FIG. 7 assembled with a different type of mounting plate of a filter unit.

Description of the preferred embodiments

As shown in FIG. 1, the filter 20 may comprise a vertical, cylindrical vessel or casing 22 made of suitable material resistant to corrosion or other action by the liquid to be filtered. The casing 22 may have an upper annular flange 24 secured thereto or integral therewith. The top of the casing 22 is closed by means of a cover or dome 25 which is also provided with an annular flange 27 which cooperates with the flange 24 of the casing 22. A dividing plate 28 (see also FIG. 2) is disposed horizontally between the casing 22 and dome 25 to divide the filter into two separate chambers communicating with each other through a plurality of openings 29 in which may be located the tubular filter elements of the present invention. A gasket 30 may be positioned in the space between the flange 24 and the plate 28, and similarly a gasket 31 may be provided between flange 27 and plate 28 to provide a tight seal between the casing 22 and cover 25. The plate member 28 is provided with a central aperture for the reception of an outlet conduit 32 through which the filtered liquid may be discharged from the dome 25 of the unit 20. A removable apertured clamping plate 33 may be provided adjacent plate 28 and may be secured thereto by means such as bolts 34.

Around the pipe 32 are a plurality of tubular filter elements, such as 35 in FIGS. 1 through 6 or 65 in FIGS. 7 and 8. Each of the elements 35 comprises a tube 38, preferably having a smooth outside surface of an inert material, such as plastic, surrounded by a flexible filter medium or strainer 40, preferably made of a sheet of perforated or woven nylon or other similar material that is unaffected by the liquid. This strainer should not have rough interstices, such as occur between the filament of a yarn. Thus it may be made of a perforated flexible sheet or woven from a monofilament thread so it will not ravel or fray. This sheet may be either fused, sewn or woven into a tube, or knitted into a tube or a sock, so that the sleeve has smooth and substantially uniform openings.

The tube 38 may be extruded or otherwise formed and is provided with rows of perforations 42 to permit the liquid being filtered to pass through the medium 40 perforations 42 and into the interior of the tube 38. One of a plurality of apertures 43 in the clamping plate 33 registers with the upper open end of each tube 38, each tube being provided with a connector 45 or 45' surrounded by a rubber O-ring or gasket 46. Connector 45 or 45' has a flange 47 against which O-ring 46 seats when tube 38 is located in an opening 29 in plate 28 as in FIG. 2. O-ring 46 seals the opening 29 when clamping plate 33 is tightened against flange 47 of connector 45 by bolts 34.

The tubes 38 may be cut to length, particularly if made from an extrusion, in which case the ends are subsequently rounded to prevent tearing or otherwise damaging the filter medium 40. Alternatively a collar 48 having a smooth beaded rim may be inserted in either or both ends of the tube 38. The flanged connector or coupling 45 or 45' may be of the form shown in either FIG. 3 or FIG. 4, respectively, having a reduced sleeve or coupling portion 50 of a diameter receivable in the collar 48 as in FIG. 3, or portion 52 of a diameter to fit directly into the tube 38 as in FIG. 4. These reduced portions provide shoulders 51 which extend over the upper ends of the tubes 38.

The upper end 53 of the fabric sleeve 40 is folded over the rim of collar 48 in FIG. 3 and tucked downwardly within the tube 38 to be frictionally retained therein by the coupling 45 or 45', the sleeve portion 50 or 52 being a tight fit within the collar 48 or the tube 38 for this purpose. The lower end 54 of the fabric strainer 40 is carried downwardly beneath the lower end of the tube 38 and is then brought upwardly within the tube 38, as shown in both FIGS. 3 and 4 of the drawings, to insure that no liquid passes into the interior of the tube without first passing through the fabric medium 40. A plug cap 55 having a semi-spherical end portion 56 and a reduced plug portion 57 may be inserted into the lower end of the tube 38 to frictionally retain the tucked-in portion 54 of fabric sleeve 40 in the tube. Similarly a plug cap 59 having a plug portion 60 may be provided for the lower end of the tube 38 in FIG. 4 to retain the folded-in end portion 54 of sleeve 40 in the tube 38. Similarly, the reduced portions on the plugs 55 and 59 also provide shoulders which extend over the lower ends of the tubes 38.

As shown in FIGS. 3, 5 and 6, stiffener means 62 may be provided in the interior of the tubular core 38. This stiffener means may include a spirally coiled spring 63 in contact with the inner surface of the core or tube 38, and a rigid member such as an angle bar 64 embraced by the spring 63. The spring 63 and bar 64 extend substantially the length of the tube 38 to maintain the filter element substantially straight throughout its length, the spring 63 additionally serving to prevent the plastic tube 38 from being crushed under pressure in the filter vessel.

Another form of filter tube assembly is shown in FIGS. 7 and 8 wherein it will be noted that one end of the plastic tube 65 may be closed at 66 and the other end 68 open to receive a coupling 70 having a threaded nipple portion 71 adapted to be received in a threaded aperture 73 in divider plate 75 (see FIG. 8) which may be substituted for the plates 28 and 33. When this type of tube 65 is used, a sock-type fabric filter medium 77 having a closed end 78 may be applied to tube 65, in which case the upper open end of the sock 77 is folded over the open end 68 and into the tube to be retained therein by the plug end 80 of coupling 70. The outer face of end 80 may be serrated as shown at 81 to increase its frictional engagement within the tube 65.

To further insure retention of the tucked-in ends 53 and 54 of sleeve 40 and upper end of sock 77 within the tube 38 and the tube 65, respectively, it has been found desirable in some instances to apply an adhesive to the coupling portions 50 and 52 of couplings 45 or 45' or plug end 80 of coupling 70 prior to insertion in tube 38 or 65. The adhesive also adheres to the tucked-in ends of sleeve 40 and together with the press fit of the couplings prevents the tucked-in ends from being pulled out by the pressure created in the pressure vessel. A suitable adhesive for this purpose may be made of polytetrafluoroethylene, for example, a mixture of "Teflon" A and B adhesives in the proportions recommended by the manufacturer.

It is to be understood that the stiffener 62 may be and usually is employed in all the different plastic tube elements of this invention. Also the threaded coupling 70 may be used instead of the connectors 45 or 45' for the tubes 38, and vice versa. Even the reduced sleeve portions 50 or 52 of the connectors 45 or 45' may have serrations 81 as shown on the coupling 70. Furthermore, the different types of plastic tubes 38 and 65 may be interchanged.

While there is described above the principles of this invention in connection with specific apparatus, it is to be clearly understood that this description is made only by way of example and not as a limitation to the scope of this invention.

What is claimed is:
1. A tubular filter element comprising:
   (a) a perforated plastic tube open at least at one end,
   (b) a collar inserted into said open end of said tube providing a smooth beaded rim for that end of said tube,
   (c) a flexible filter sleeve around said tube and folded over said rim into said end of said tube,
   (d) a tubular connector in said collar in said one end of said tube for frictionally holding said folded portion of said sleeve against the inside of said collar, said tubular connector having a shoulder extending radially outwardly over said rim and end of said tube,
   (e) means for solely supporting said element by said tubular connector, and
   (f) stiffener means comprising an angle bar surrounded by a helical spring within said tube to prevent axial distortion thereof and collapse of said tube under pressure.
2. A filter element according to claim 1 wherein said tube is open at both ends with a said collar in each open end, and said sleeve is folded over the rims of said collars at both ends of said tube.
3. A filter element according to claim 2 including a plug in said collar at the other end of said tube for frictionally holding said folded-over end of said sleeve at said other end of said tube.
4. A filter element according to claim 1 wherein said tubular connector is serrated for frictionally holding said flexible filter sleeve in said tube.

References Cited

UNITED STATES PATENTS 401,930   4/1889   Cooper et al. _____ 210—322

(Other references on following page)

UNITED STATES PATENTS

| | | | |
|---|---|---|---|
| 1,734,325 | 11/1929 | Cannon | 210—356 X |
| 1,872,229 | 8/1932 | Blackmore | 210—497 X |
| 2,440,487 | 4/1948 | Rayburn | 210—323 X |
| 2,605,903 | 8/1952 | Schuller | 210—333 X |
| 3,037,634 | 6/1962 | Mills | 210—323 X |
| 3,143,503 | 8/1964 | Schmidt et al. | 55—492 X |
| 2,784,846 | 3/1957 | Olson et al. | 210—333 |
| 3,237,775 | 3/1966 | Porter et al. | 210—323 |
| 3,291,310 | 12/1966 | Marvel | 210—169 |
| 3,294,241 | 12/1966 | Sicard et al. | 210—343 X |
| 3,327,864 | 6/1967 | Ball et al. | 210—497 X |

FOREIGN PATENTS

| | | |
|---|---|---|
| 50,479 | 1/1890 | Germany. |
| 698,751 | 10/1953 | Great Britain. |
| 1,156,304 | 12/1957 | France. |
| 926,778 | 5/1963 | Great Britain. |

REUBEN FRIEDMAN, *Primary Examiner.*

F. SPEAR, *Assistant Examiner.*